May 26, 1970    D. G. JUDGE, JR    3,514,352
HONEYCOMB EXPANDING DEVICES
Filed Oct. 23, 1965    3 Sheets-Sheet 1
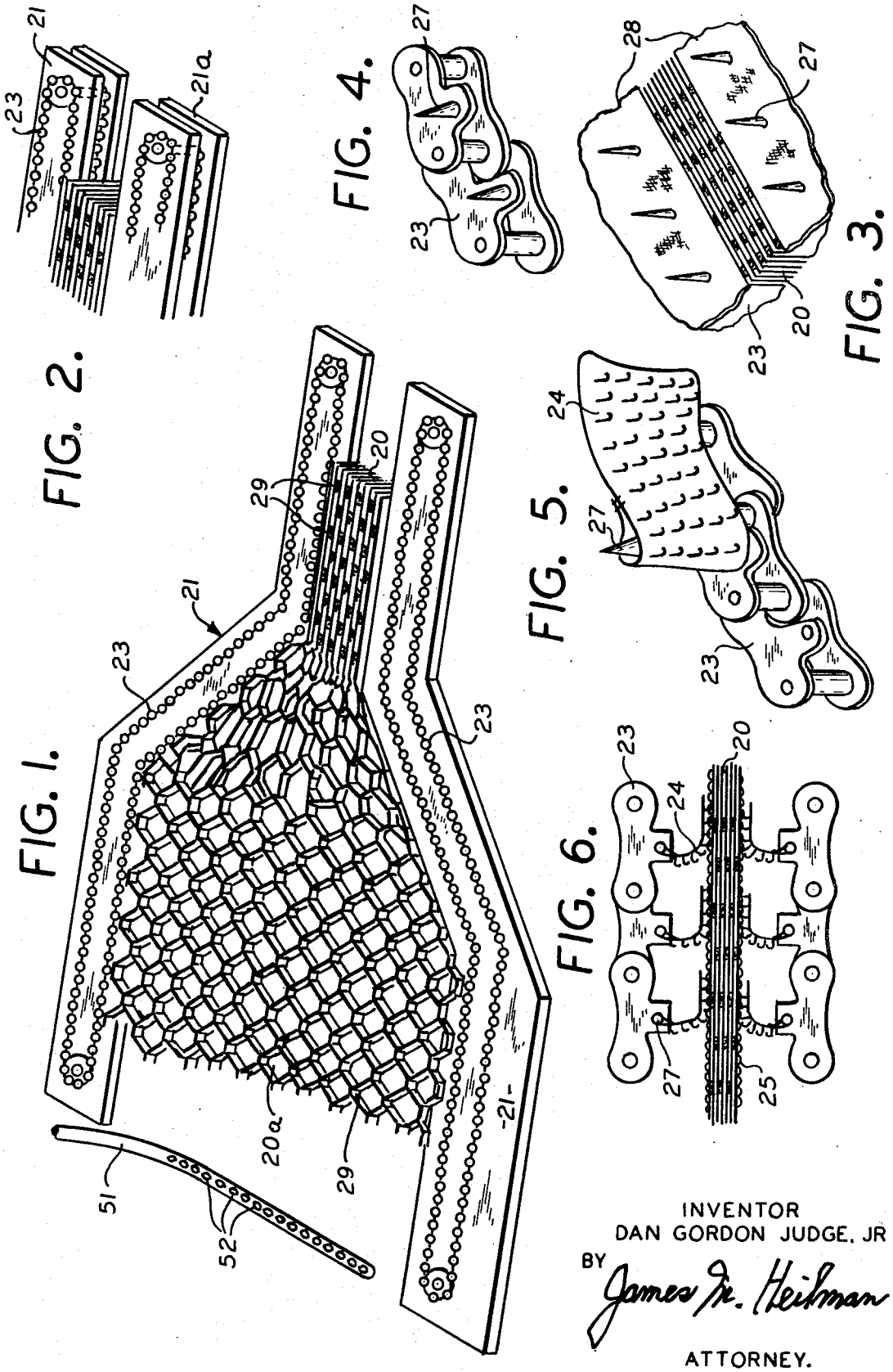
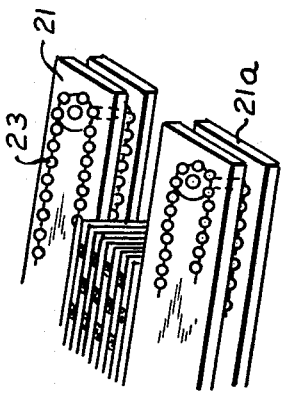
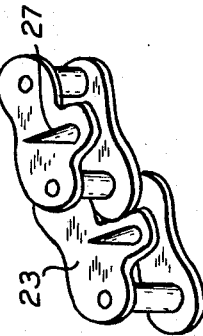
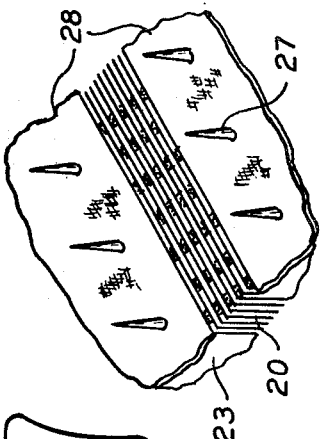
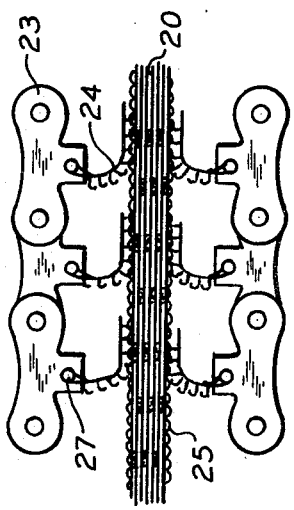
INVENTOR
DAN GORDON JUDGE, JR
BY *James M. Heitman*
ATTORNEY.

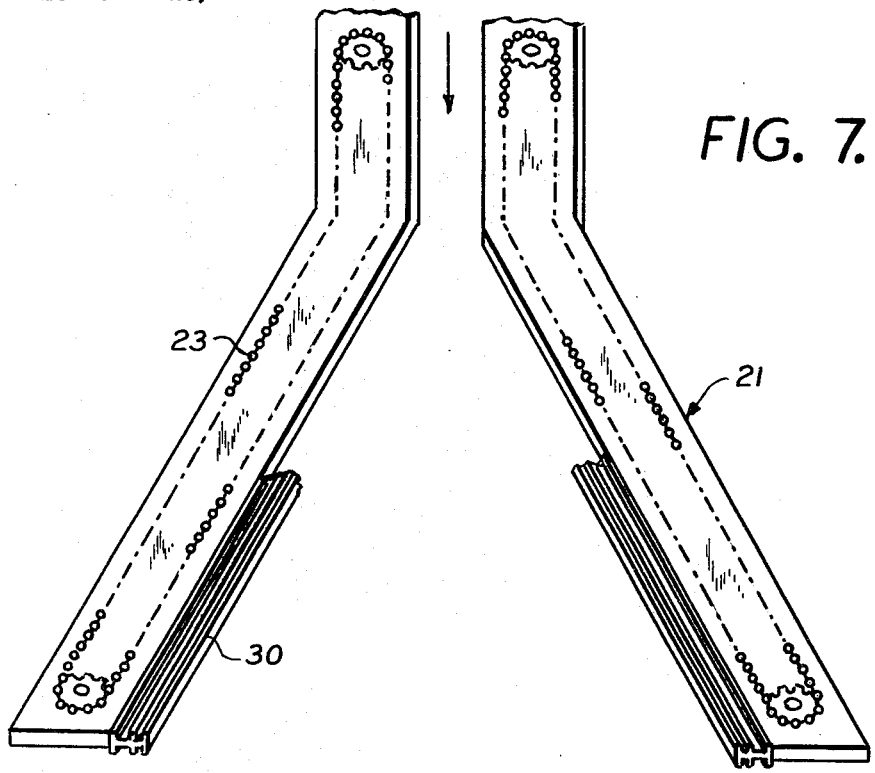
FIG. 7.
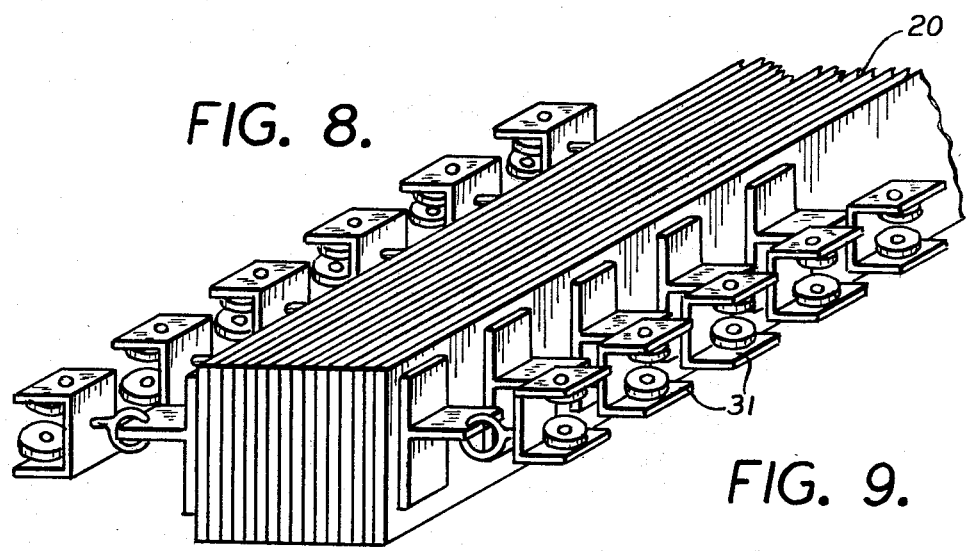
FIG. 8.
FIG. 9.
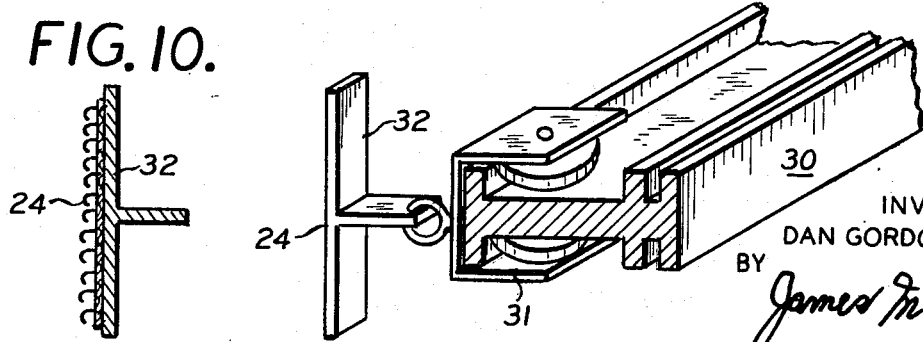
FIG. 10.
INVENTOR
DAN GORDON JUDGE, JR.
BY
James M. Heitman
ATTORNEY.

INVENTOR
DAN GORDON JUDGE, JR.
BY *James M. Heilman*
ATTORNEY.

United States Patent Office 3,514,352
Patented May 26, 1970

---

3,514,352
HONEYCOMB EXPANDING DEVICES
Dan Gordon Judge, Jr., Sarasota, Fla., assignor to Honeycomb Company of America Inc., a corporation of New York
Filed Oct. 23, 1965, Ser. No. 503,703
Int. Cl. B31d *3/02;* B32b *31/00*
U.S. Cl. 156—197                                    11 Claims

ABSTRACT OF THE DISCLOSURE

This invention pertains to expanding devices, and methods for expanding honeycomb cores, irrespective of whether the core is made by longitudinal striping or by transfer striping, and consists of side gripping elements which will expand the elements which will expand the honeycomb cells equally without undue stress among any of the cells.

---

This invention pertains to expanding devices, and methods for expanding honeycomb cores, irrespective of whether the core is made by longitudinal striping or by transfer striping, and consists of side gripping elements which will expand the elements which will expand the honeycomb cells equally without undue stress among any of the cells. This invention constitutes subsequent steps in the manufacture of honeycomb cores as set forth in my application, Ser. No. 503,304, filed currently herewith on Oct. 23, 1965, which application is incorporated herein in its entirety.

A further object of my invention is to provide a method for expanding a stack or slice of laminated sheets after they have been cured, by use of a technique which expands the slice gradually and uniformly. By this process there is a gradual expansion of the slice in a fan-like fashion starting at one end of the slice to be expanded and gradually opening the rows and columns of cells the entire length of the stack so as to accomplish a uniform expansion of each cell. This procedure overcomes one of the principal shortcomings of present methods involving abrupt expansion, wherein by expanding the entire stack at one time, strain lines and distorted cells are bound to occur in the finished product.

A further object of this invention is to provide an expanding device which can be operated to expand at any desired rate depending upon the divergence of the extending arms of the expanding yoke.

Another object of this invention is to provide an inexpensive, trouble-free method for expanding honeycomb cores.

With the foregoing and other objects in view as will appear from a reading of the following specification and claims, the invention resides in the novel arrangement and combination of parts and in the details of construction and process of manufacture hereinafter described and claimed, it being understood that changes in the precise embodiment of the invention may be made within the scope of what is claimed without departing from the spirit of the invention. It will be further understood that the invention is susceptible of embodiment in many and various forms, some of which are illustrated in the accompanying drawing and photographs, and that the structural details or particular steps of the method herein set forth may be varied to suit particular purposes and still remain within the inventive concept.

Referring to the figures:

FIG. 1 is a perspective view showing a pack of bonded and sliced honeycomb cores being expanded;

FIG. 2 is a perspective view of the tight, unexpanded end of the pack;

FIG. 3 is a top perspective of a compact pack or slice showing a fabric bonded to the outside edges of a slice to facilitate attachment to the drive chain;

FIG. 4 is a detailed view of the chain illustrating the fabric securing points;

FIG. 5 is a view similar to FIG. 4 but with the open hook fabric secured thereto;

FIG. 6 illustrates the open hook fabric engaging with corresponding type fabric secured to a tight pack;

FIG. 7 is a top view of the yoke showing the tracks;

FIG. 8 illustrates the train elements in engagement with a tight pack, while

FIG. 9 is a detailed view showing one train element positioned in the track, and FIG. 10 illustrates a hand faced with the hook fabric;

Figure 11:
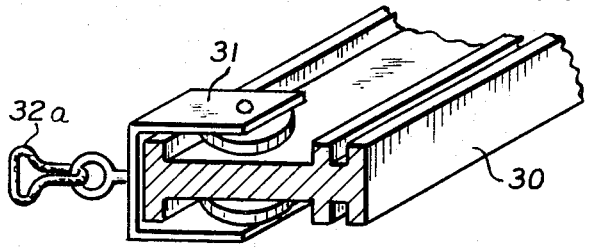
FIG. 11 shows a modified hook for the train.
Figure 12:
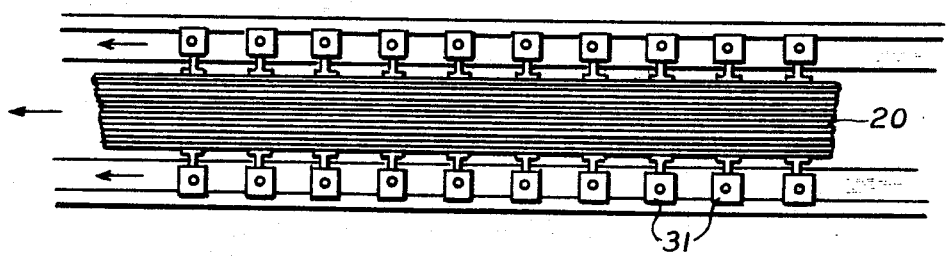
FIGS. 12 and 13 are plan views of a bonded pack or slice in open and closed position, respectively.
Figure 13:
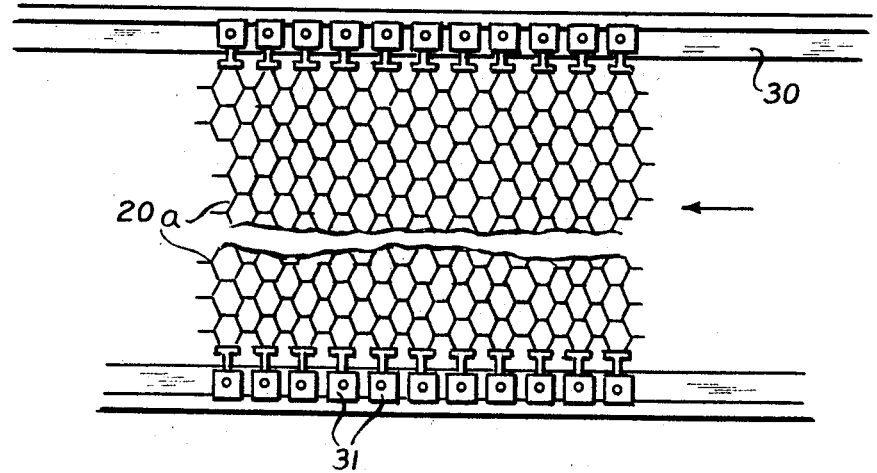

Referring to the major assemblies and elements, 20 is a closed slice of desired thickness or height cut from an assembled and bonded pack cemented at areas 29 to form open cells 20a.

21 is a yoke expander.—It is a frame for expanding the slice of honeycomb having two movable arms equipped with a drive chain 23 on each side or arm which travels the length of the arm and return in a continuous fashion.

The distance between the arms is adjustable at both ends and the angle setting on each arm is also adjustable. One end is set at a spacing to allow the attachment of the unexpanded slice 20, the other end is opened to the desired width of the finish expanded slice of honeycomb. Both drive chains 23 are powered and driven at the same speed in the same direction. The angle sections are attached to the end sections and move as the width settings are changed to the desired size.

23 are the drive chains.—As a part of the yoke expander 21 are chains equipped with tabs on each link to allow attachment of hooks or pins 27.

24 is hook cloth.—A heavy duty nylon or other cloth in which strands or particle loops extend from one side.

25 is loop cloth.—A heavy duty high pile cloth having more or less continuous loops which raise up in random fashion.

27 are pins or hooks attached to the links in the drive chains 23 for the purpose of making a mechanical attachment between the slice of honeycomb to be expanded and the drive chains 23.

28 indicates a textile or glass cloth which may be bonded to the outside edges of the slice 20 to facilitate a means of attachment to the yoke expander drive chains 23.

30 refers to I-beam bars or tracks which are metal bars. These tracks may be attached to the edges of the arms of the yoke expander 21, and run parallel to the edges of the arms and the drive chains 23. These bars constitute rails for roller slide assemblies 31 to ride on.

31 is the roller slide assemblies which consist of usually two small wheels attached to the inside of a U-shaped housing and designed to fit on and roll freely on the I-beam bar 30. They are also equipped with a small ring to allow attachment of rings or T 32.

32 and 32a indicate T's or rings. Hook fabric 24 or loop fabric 25 are bonded with adhesive, adhesive tape, mechanically fastened or secured by other suitable means to the flat surface of each of the two outside sheets on the slice to be expanded 20, as well as to the face of the T's or rings.

51 indicates a manifold or oven with openings 52 for hot air or other forms of heat in order to set the resin permanently after the core has been expanded. This is optional and may be eliminated.

In order to completely comprehend the advantages of the expansion process that is subsequently described, it is important that one understand certain facts and characteristics of the material to be expanded. In the case of metal honeycomb, for example, when the unexpanded slice which has been cut from the pack is expanded, normal to the bond lines, by pulling the outside sheets in opposite directions, the slice has a tendency to contract in width as it is stretched in length. If the force required to expand the slice is not uniform in relation to the contraction of the slice, this uneven force may manifest itself in misshapen or distorted cells within the expanded slice. This condition is very undesirable in a structural honeycomb core material, since it will affect the ultimate physical properties of the core.

The concept of the yoke expander was conceived to compensate for or correct the characteristics inherent in the material by, in effect, first expanding the slice in a fan-like fashion at the beginning of the expander, which has the effect of applying the expanding force to each row of cells gradually and uniformly, and then gradually opening the slice to the finished size.

This method not only applies uniform expanding force on the slice, but also compensates for the contraction of the slice during its expansion.

After the pack has been bonded and the slice 20 cut, usually at right angles, the slice is ready to be expanded. The slice of unexpanded, expansible honeycomb 20 is placed in the yoke expander 21. As it passes down the length of the expander, the outside sheets of the slice are gradually pulled in opposite directions. The yoke expander is equipped with drive chains 23 which move by mechanical means, in unison down the length of the yoke. These chains are equipped with small tabs, to which pins or rods 27 are attached. These pins or rods 27 are used to operate on the slice of honeycomb to be expanded through the drive chains 23.

Several methods may be used. For example, the first method consists of bonding a layer of plain, textured, or ribbed glass fabric or textile fabric 28 to the edge of the slice to be expanded, allowing sufficient excess on each side to form a tab or tail hanging from the edge of the slice. The slice is then placed on the yoke expander (FIG. 3) and the tabs or tails 28 positioned in such a manner that they are pierced by the pins or rods 27 attached to the drive chains 23 on each side of the yoke expander. Thus, a mechanical attachment is established between the cloth tabs 28 which are bonded to the edges of the slice 20, and the drive chains 23.

When power is applied, these two drive chains 23 move in a track gradually away from each other until the desired width of the honeycomb slice has been reached, and then they move parallel to whatever desired distances necessary to complete the formation of the honeycomb blanket. In other words, this results in a gradual opening of the slice in what might be described as a fan-like fashion. Opening the cells of the honeycomb gradually, approximately one row at a time, reducing greatly the force required to expand the honeycomb, results in an extremely uniform expansion of the cells.

When the slice reaches the end of the expander and is opened to the desired size, the cloth tabs 28 are stripped from the pins 27 yielding a finished expanded piece of honeycomb core material. When the material comprising the honeycomb core is such as to require setting to prevent it from contracting after it has been expanded as described above, this may be accomplished by appropriate means before the expanded core is stripped from the pins 27. Some of the means of setting is stripped from the pins 27. Some of the means of setting the expanded core are (1) heat (such as 51, 52), (2) steam, (3) over-expansion, (4) cementing one external face upon the expanded core.

A second method of expanding a slice of honeycomb is to bond a flat layer of plain, textured, or ribbed looped nylon cloth 25 to the outside edges of slice 20 and attach to the drive chains 23, by means of rods 27 a tab of nylon cloth with tiny hooks of nylon 24. The nylon hooks in the tab 24 which brought into physical contact with the looped nylon fabric 25 lock onto the loops, thus forming a mechanical tie between the two. The looped nylon cloth 25 is bonded flat to the opposite edges of the slice, and the nylon hook tabs 24 are attached to the T elements of drive chains. This type of fabric material is patented and is sold in the United States under the trademark "Velcro" by Velcro, Ltd. of England, U.S. Pats. Nos. 2,717,437 and 3,009,235.

When the slice to be expanded is placed in the expander using this method, the fabric hook tabs 24 pull the outside edges of the slice in opposite directions in the same manner and with the same effect as described in the first method of expansion outlined above. These hook tabs 24 are sufficiently flexible and long enough to make allowance for the contraction of the slice 20 as it is expanded in length. Again, when the slice is expanded to the desired width, the fabric hook tabs 24 are stripped from the looped cloth 25 at the end of the yoke expander, thus yielding a finished expanded piece of honeycomb core material.

Other methods of expanding the slice of honeycomb 20 may be accomplished with the addition to the yoke expander of two I-beam bars or rails 30. When the I-beam bars are used, the first step in the operation is to attach T's or rings 32 to either side of the slide. The attachment of the T's or rings 32 to the slice may be accomplished by bonding them directly to the outside sheet on each side of the slice, or otherwise securing them to the outside, similar to that described in the method above, wherein the outside edges of the slice have been covered with a layer of nylon loop cloth 25 and the long side or flat side of the T 32 has been covered with nylon hooks 24. When the flat face of the nylon hook covered T comes in contact with the nylon loop cloth on the edges of the slice, a simple but effective mechanical lock between the two is accomplished.

One end of the T's or rings 32 is designed so that it can attach to small swivel O-ring built in the roller slide assembly 31.

In preparing the slice of honeycomb to be expanded 20, the T's or rings 32, with a roller slide assembly attached to each ring or T, is secured to the outside edges of the slice. The purpose of establishing a space between each T or ring on either side of the slice 20 is to make allowance for the fact that when the slice is expanded completely to form the cells of the honeycomb, the slice itself will contract in width as it is expanded or opened in length. This contraction of the slice results in the roller slide assemblies coming together similar to the action of draw drapes when they are opened. These roller slide assemblies make allowance for this fact, while at the same time functioning as a means of attachment for the expanding operation.

The slice with the T's or rings 32 and roller slide assemblies 31 attached are fed into the narrow end of the expander and pulled down the length of the expander by attaching one or two roller slide assemblies 31 on each side of the slice to the drive chains 23 on the expander arms. These drive chains force the slice down the length of the expander which, because of the design that places two sides in a Y- or V-like shape, causes a pulling action to occur on the two outside sheets of the slice 20, causing it to open up or expand in a fan-like fashion, the advantages of which have been previously described herein.

While I have described two methods of attaching the slice to the drive chains 23 on the expander, this invention is not limited to these two means of attachment, as there are numerous other methods of attachment which are commercially available and may be used in conjunction with the above described method and machine for expanding core.

Manifold 51 could be replaced by a large heated oven through which the core could pass. Also, various types of panels may be used for facings.

What is claimed is:

1. A method for expanding structural honeycomb core material comprising securing material having a looped textured surface to each side sheet of a honeycomb slice, securing a material having a cooperating hooked textured surface to a movable assembly positioned along a yoke having divergent arms, inserting a slice of compact material into said yoke having divergent arms, running the movable assembly having the said hooked textured material secured thereto at such speed that both textured surfaces will become engaged thereby moving the honeycomb material and gradually expanding it to open to its full cell size.

2. A method for expanding structural honeycomb core material comprising securing a fabric having a looped textured surface to each side sheet of a honeycomb pack, cutting the pack into slices of the desired thickness, securing a fabric having a cooperating hooked textured surface to a movable assembly positioned on a yoke having divergent arms, inserting a slice of compact material into said yoke having divergent arms, running the movable assembly having the hooked textured surfaced fabric secured thereto by means of drive chains at such speeds that both textured fabric surfaces will engage and the honeycomb material will be driven along and gradually expanded to open to its full cell size.

3. A method for expanding bonded structural honeycomb core material comprising securing a fabric having a looped surface to each side sheet of a honeycomb pack, cutting the pack into slices of the desired thickness, securing a fabric having a cooperating hook surface to a roller assembly, inserting a slice of compact material into a yoke having divergent arms, running the roller assembly having the hook surfaced fabric secured thereto by means of drive chains positioned along said yoke at such a speed that both fabric surfaces will engage and the honeycomb material will be driven along and gradually expanded to open to its full cell size.

4. A method for expanding compact honeycomb material in unsliced pack form or in sliced section form, comprising attaching a first looped textured fabric to the outside sheets of said compact honeycomb material, positioning a second cooperating hook textured fabric on a moveable divergent element in contact with said loop fabric so as to interlock with said first mentioned fabric when said element moves, and applying a motivating force to said divergent element to cause said honeycomb cells to simultaneously move forward and open gradually.

5. A method as set forth in claim 4 wherein said motivating force exerted on said divergent element interlocks said second textured fabric with said first textured fabric thereby moving said first textured fabric and compact honeycomb in a forward direction at the same time as moving in a lateral direction.

6. An expanding device for honeycomb having a looped textured fabric secured to the outside sheets of the honeycomb comprising a yoke with diverging arms, chain means positioned on said yoke, a chain driving means associated with said yoke and positioned along said arms, hooked textured fabric means secured to said chain means and cooperating with the fabric secured to the side of the honeycomb whereby when said chain is driven, the honeycomb will be opened to its full cell size.

7. A device as set forth in claim 6 in which the cooperating fabric means are secured to said chain means through a roller assembly.

8. A device as set forth in claim 7 in which the roller assembly operates in a track parallel to the sides of the yoke, and the cooperating fabric means is formed with hooks and is positioned on a T element connected to said roller assembly.

9. An expanding device for multi-cell honeycomb core having a looped textured fabric secured to the outside sheets of the honeycomb, comprising a yoke with gradually diverging arms, chain means positioned along said yoke, a chain driving means positioned on said yoke, a hooked textured fabric secured to said chain means, said textured fabrics cooperating with each other and with said chain driving means to propel said honeycomb forward and at the same time gradually expand the cells so as to avoid distortion and stress in the same.

10. A device as set forth in claim 9 in which the cooperating fabric means are secured to said chain means through a roller assembly.

11. A device as set forth in claim 10 in which the roller assembly operates in a track parallel to the sides of the yoke, and the cooperating fabric means is formed with hooks and is positioned on a T element connected to said roller assembly.

References Cited

UNITED STATES PATENTS

| | | | |
|---|---|---|---|
| 2,648,371 | 3/1948 | Goodwin et al. | 156—197 |
| 3,009,235 | 11/1961 | De Mestral | 161—48 |
| 3,345,231 | 10/1967 | Gidge et al. | 156—181 |
| 2,756,496 | 7/1956 | Holland | 156—197 XR |
| 3,035,961 | 5/1962 | Jones et al. | 156—197 |
| 3,162,942 | 12/1964 | Christman | 29—455 |

JOHN T. GOOLKASIAN, Primary Examiner

D. J. FRITSCH, Assistant Examiner

U.S. Cl. X.R.

156—250, 496, 510, 538; 161—68